Jan. 20, 1959      E. R. HOLMAN      2,869,267

METHOD OF ETCHING ALUMINUM AND ALUMINUM ALLOYS

Filed Feb. 28, 1957

EMMETTE R. HOLMAN
INVENTOR.

BY Philip Subkow
ATTORNEY

United States Patent Office 2,869,267
Patented Jan. 20, 1959

2,869,267

METHOD OF ETCHING ALUMINUM AND ALUMINUM ALLOYS

Emmette R. Holman, Pasadena, Calif., assignor to Turco Products, Inc., Los Angeles, Calif., a corporation of California Application February 28, 1957, Serial No. 643,045

18 Claims. (Cl. 41—42)

This invention relates to methods of etching of aluminum and aluminum alloys by means of alkaline solutions whose alkalinity is due to free alkali metal hydroxides, e. g., sodium or potassium hydroxides. The term "aluminum" employed in the specification and claims is intended to denote pure aluminum, commercial grade aluminum containing small amounts of other materials, and alloys of aluminum.

Commerical operations, in which such processes are employed to produce deep etching of the aluminum to a degree to produce changes in the structural characteristics of the metal part equivalent to that produced by machining operations, have employed various compositions and devices to control the etching process. Reference may be had to the following issued patents, as illustrative of such processes: K. W. Newman, Patent No. 2,739,883; K. W. Newman, Patent No. 2,762,694; and M. C. Sanz, Patent No. 2,739,047.

Ideally it is desirable that the parts produced simulate machined parts in appearance and form. Thus, where the part produced forms a depression in the surface of the part, the peripheral walls should desirably either form a 90° dihedral angle with the bottom of the depression or that there be a fillet at the juncture of the base and walls which is of a radius such that the etch factor shall not be greater than about one. The etch factor is the distance to which the aluminum is dissolved in a lateral direction divided by the depth of etch.

Experience has shown that such etch factors which would be satisfied along the entire periphery of the etch and are predictable, are attainable only rarely and accidentally. No process employing etching solutions, whose alkalinity is due to free alkali metal hydroxide, in the prior art, known to applicant, can be relied upon to produce such etch factors.

Additionally, it is desirable to produce etch patterns such that the walls follow a predetermined pattern and are smooth and even, and that the bottom of the depression be bright, smooth and planar without pitting, roughness, or contouring. It is particularly important to obtain smooth etched surfaces in order to improve fatigue properties and reduce or eliminate localized areas of stress concentration. In sum, the ideal is to reproduce a part similar to a machined part. The production of smoothly etched wall surfaces is also desirable in the production of aluminum lithographic plates.

However, experience has shown that the process is uncontrollable to produce such results, and unpredictably and accidentally the process will sometimes produce undesirable parts.

I have found that where an etching bath employing free NaOH or free KOH as the etching chemical produces parts substantially different from machined parts in one or more respects, as more fully described below, I may improve the result and eliminate the above disadvantageous effects by adding to the bath a small amount of an alkanolamine, preferably triethanolamine. I may also employ the alkanolamine in the presence of aluminate salt of the alkali metal hydroxide, either added initially or as formed in the etching reaction.

I may thus, if desired, produce an etch free of one or more, or all, of the above disadvantages, and obtain the desired etch factor. The walls are straight or of the desired conformation and the base is planar and bright and smooth. I may thus reproduce the pattern of the unmasked portion with fidelity.

While I do not wish to be bound by any theory of the activity of the etching reagents and procedures of my invention, I have observed that the improvement resulting from the effect of the additives is accompanied by slowing down of the rate of attack of the etchant on the aluminum. I have also noted that the addition of the alkanolamine increases the viscosity of the solution. I do not know whether the increase in viscosity is one of the factors responsible for the improved etching, but understandably it controls the rate of attack, and I mention it merely as an observed phenomenon.

The solutions employed may be either liquid or solid at room temperature, but it is necessary that they form liquid solutions at the temperature of the reaction. While I call them solutions I do not desire to be understood that the reagents are completely molecularly or ionically dispersed, since they may be partially colloidally dispersed, or even partially in the solid state, as evidenced by a precipitate.

In general, I employ solutions containing one or more percent by weight of alkanolamine and one or more percent of free alkali metal hydroxide, with or without additional alkali metal aluminate and water. The aluminate, alkanolamine and alkali may be employed in greater amounts but not in amounts or proportions such that they give a solid mixture at the temperature of the etch reaction, although they may be solid at lower temperatures. By the term "solid mixture" is meant not only a dry mixture but also mushy and highly viscous mixtures containing some liquid, and mixtures in the form of a crystal matrix having liquid entrapped in the interstices of the matrix but substantially retaining the rigidity of a solid material.

I may also employ other additives, such as citric acid, gluconic acid, saccharic acid, mucic acid, or salts thereof, sorbitol, and the like or the soluble salts thereof for modifying the scale or sludge forming tendency. The useful compositions of my invention are etch baths having the following ingredients: NaOH or KOH, sodium or potassium aluminate, alkanolamine. A broad range of concentrations in solution of the active essential ingredients is about 5 to 30% by weight of the solution of NaOH or KOH, 0 to about 30% sodium or potassium aluminate and about 1 to 15% triethanolamine. The preferred range of concentrations in solutions, e. g., aqueous solutions, is about 5-24% by weight of the solution of NaOH or KOH, about 3.5-17.5% sodium or potassium aluminate, and about 1-12% triethanolamine. A preferred specific composition within the above range is an aqueous solution containing about 20% by weight NaOH or KOH, about 14% sodium or potassium aluminate, and about 2% triethanolamine. It is to be understood that the above ranges are not critical and concentrations of the essential ingredients can be outside these ranges and still be effective.

Also within the invention are solid compositions of the above noted ingredients which when added to a solvent such as water for preparation of the working solutions, produces solutions preferably within the aforementioned concentrations. Thus, for example, a solid composition for this purpose can take the form of a mixture of about 5 to 24 parts by weight of NaOH or KOH, about 3.5 to 17.5 parts of sodium or potassium aluminate, and about 1 to 12 parts of triethanolamine.

It is preferable to use low chloride containing sodium hydroxide, since the presence of material amounts of chlorides causes roughness and pitting. Smoother surfaces are obtained by using pure grades of alkali free of chlorides and water which is free of chlorides.

The triethanolamine may be pure triethanolamine or any commercial grade, but I prefer to use the 98% commercial grade. The lower grades contain significant amounts of di and mono-ethanolamines, which are relatively inert in my baths as compared to triethanolamine or the triethanolamine component of the commercial mixtures.

The sodium or potassium aluminate may be commercially available aluminate or obtained by dissolution of aluminum in the alkali.

Some of the above scale and sludge modifying agents have the property of producing deleterious etch results. Thus, for example, gluconate used by itself as an additive to an alkali metal hydroxide etching solution containing sodium aluminate results in a wavy surface, and the addition of as little as 1% of triethanolamine to such a solution corrects this defect to give a smooth specular surface of excellent etch factor free of the defects described herein.

When the etch is bright, i. e., specular and smooth with good walls, i. e., smooth and uniform, producing the pattern with a predictable etch factor and free of defects as described in the following paragraphs, and in which the fillet at the bottom of the etch between the wall and the bottom of the etch has a radius substantially less, e. g., about ⅓ or less, than the depth of the etch, I consider this a desirable etch and classify it as an "A" etch.

An etch substantially like an "A" etch but where the fillet at the bottom of the etch has a radius equal to or greater than the depth of the etch and in this respect is inferior to an "A" etch, I term an "Aa" etch.

Where excessive pitting is observed with pits randomly distributed and of various sizes, some being of gross magnitude and depth, which I denominate as craters, and the walls are of like surface with a wavy and scalloped pattern and are not vertical, having a fillet of large radius, the curvature beginning at the bottom and running up close to the top of the wall, I classify this as a "Bb" etch.

Where the pitting is less marked, with absence of cratering, but the walls are wavy and scalloped, this is also unacceptable, but shows some improvement over "Bb," I call this type of etch a "Ba" etch.

Where the surfaces of the base and walls are irregular, as a result of random rates of etching across the surfaces, but without the presence of macroscopic pits, so that the surface feels very rough on tactile examination, I call this a "Cb" etch.

As the surfaces of the bottom and walls become less rough and the walls are scalloped and wavy, as is perceptible on tactile examination, I call this surface a "Ca" etch.

As the surface becomes less rough than a "Ca" surface, it has an appearance which may be likened to the surface of leather or orange peel, the rough projections characterizing a "Ca" surface being rounded off. The walls may be quite vertical but are wavy and scalloped. I call such a surface a "D" etch.

As the surfaces become smoother than the "D" etch surfaces, the orange peel or leathery appearance is smoothed out but an uneven surface still appears on the bottom and walls; the walls are still wavy and scalloped but perceptibly less so than in the Ba, Bb, Ca, Cb and D etches. Such an etch I call an "E" etch.

Sometimes the bottom is quite smooth and uniform but there will be isolated macroscopic projections irregularly spaced across the bottom in the form of islands. I call this an "F" etch. This may be accompanied by walls which are wavy and rough as in a "Bb" etch and by shrinkage as in a "G" etch.

Sometimes the bottom is smooth and a faithful reproduction of the pattern, the periphery of the bottom reproducing the etch pattern but with a negative magnification being in area much smaller than the area of the pattern, sometimes as much as one-half or less than one-half of the pattern. I call this shrinkage pattern a "G" etch.

Sometimes the pattern shows smooth ridges which reproduce the pattern and are spaced from the walls. I call this contouring and the resulting etch is termed an "H" etch.

Sometimes the etch approaches an "A" etch but the walls show multiple surfaces which are at large dihedral angles to each other, and the bottom at the juncture with the walls shows terraced surfaces running parallel to the walls, as if the surface had been creased. I call this an "I" etch.

Sometimes the etched surfaces are dull, i. e., of the same reflectance as the original unetched surface, but sometimes the etch is brilliant, of much greater reflectance showing a specular appearance. I call this specular appearance a "J" surface. This result may appear with any of the above etch results.

Where the walls around the etched surface are badly eroded, I symbolize this effect by the letter "K."

Sometimes the walls and bottom may show one or more of the above etch effects.

Employing the above conventions, the effect of the concentration of alkali and of the addition of alkanolamine and of sodium aluminate to an alkali solution is illustrated in the following tables. In each table the result of an etch was made employing a solution composed of alkali of the stated concentration at the indicated temperature all for equal lengths of time.

The sodium hydroxide employed was commercial grade NaOH (76% $Na_2O$) and the weight percentage reported is the weight percentage of this material, i. e., 12% is 12 pounds of this material in 100 pounds of solution. The aluminate is a commercial aluminate containing free NaOH, and may for practical purposes be called sodium aluminate trihydrate having the approximate probable formula of $Na_2Al_2O_4 \cdot 0.3NaOH \cdot 2.66H_2O$. The material thus contains 72% anhydrous sodium aluminate and 5% free NaOH. The weight percentage of aluminate reported in the tables is the weight percentage of this material. For example, an 8% aluminate solution contained 8 pounds of the above material in 100 pounds of solution. This experiment was repeated employing various percentages of sodium hydroxide and triethanolamine and aluminate.

Tables 1 through 6 report results of tests using 2S (2S–0) or 1100–0 alloy) aluminum alloy [1% (Si+Fe); 0.20 Cu; Mn 0.05; Zn .10]. All values are maximum values, except where ranges are given.

Tables 7 through 12 give the results observed on 24S (24S–T4; 2024–T4) aluminum alloy (Si 0.5; Fe 0.5%; Cu about 4 to 5%; Mn about 0.3 to 0.9%; Mg about 1.2 to 1.8%; Cr 0.1%; Zn 0.25%).

Tables 13 through 17 report results on 61S (61S–T4; 6061–T4) aluminum alloy (containing Si about 0.4 to 0.8%; Fe 0.7%; Cu about 0.15 to 0.4%; Mn 0.15%; Mg 0.8 to 1.2%; Cr 0.15 to 0.35%; Zn 0.25%), and Tables 18 through 23 report results on 75S (75S–T6; 7075–T6) aluminum alloy (containing Si 0.5%; Fe 0.7%; Cu about 1.2 to 2%; Mn 0.3%; Mg about 2 to 3%; Cr 0.18 to 0.4%; Zn about 5 to 6%, and Ti 0.2%).

Tables 1 through 3 and 7 through 9, 13, 14, and 18 through 20 report results of etch at 98° C., while Tables 4 through 6, 10 through 12, 15 through 17, and 21 through 23 report results of etch at temperatures of 85° C.

The solutions were made up as follows:

In Tables 1, 4, 7, 10, 13, 15, 18 and 21 the solution was made up with 12% NaOH by weight, to which was added 0, 8, 16, 24 percent commercial sodium aluminate.

Thus, in reading the tables the composition of the solution is given by the horizontal rows and vertical columns which combined give the composition by weight of the solution as employed in each experiment reported in the tables.

In the case of the 24% NaOH concentration series, the baths which were solid at room temperature, but liquid at the 85° to 98° reaction temperature were those containing 8 or more percent triethanolamine and also 8 or more percent sodium aluminate, and those containing 16 or more percent sodium aluminate.

Twelve percent caustic solutions were made up containing either 0, 8, 16 or 24% aluminate, to which were added 0, 4, 8 or 12% of triethanolamine, giving a total of 16 solutions. The Tables 1, 4, 7, 10, 13, 15, 18 and 21 define the results using these compositions.

In Tables 2, 5, 8, 11, 14, 16, 19 and 22 similar solutions were employed but with 20% NaOH concentration.

In Tables 3, 6, 9, 12, 17, 20 and 23 similar solutions were employed but with 24% NaOH concentration.

The tests reported in the tables using the above solutions were made as follows: The specimens were panels 4 inches by 4 inches and one-half inch thick. They were covered by an alkali resistant synthetic rubber coating but exposing a standard 4 pointed star pattern and allowed to etch for a period sufficient to give an etch, which in depth, i. e., from the original surface to the bottom of the etch, was 3/8″ ±1/16″. Baths were of sufficient size so that the change in concentration of aluminate and free alkali during the etch was not significant. The exception was in the case of those baths, which in their initial composition contained no aluminate, since aluminate is formed during the run. The increase in concentration was not however sufficient to raise the aluminate concentration at the end of the run to the next higher level reported in the tables.

The results of the etch were observed visually and by feel.

Table 1
[2S aluminum, 98° C., 12% NaOH.]

| Triethanolamine, percent by weight | Aluminate, percent by weight | | | |
|---|---|---|---|---|
| | 0 | 8 | 16 | 24 |
| 0 | | Bb; H | Bb | Ca | Ca |
| 4 | | H | Ba | Aa | Aa |
| 8 | | Ca | Aa | Aa | Ca |
| 12 | | | Aa | Ca | Ca |

Table 2
[2S aluminum, 98° C., 20% NaOH.]

| Triethanolamine, percent by weight | Aluminate, percent by weight | | | |
|---|---|---|---|---|
| | 0 | 8 | 16 | 24 |
| 0 | Ca; H | Ca; H | Ca; H | H; J |
| 4 | Ca | Ca | Aa | Aa |
| 8 | F | Ba | Ca | A; J |
| 12 | | Ca | Ca | Aa |

Table 3
[2S aluminum, 98° C., 24% NaOH.]

| Triethanolamine, percent by weight | Aluminate, percent by weight | | | |
|---|---|---|---|---|
| | 0 | 8 | 16 | 24 |
| 0 | | | | |
| 4 | Ca; J | Aa; J | Aa; J | Aa |
| 8 | Ca; J | Cb; J | Aa; J | Aa |
| 12 | Ca; J | Aa; J | Aa; J | Aa |

Table 4
[2S aluminum, 85° C., 12% NaOH.]

| Triethanolamine, percent by weight | Aluminate, percent by weight | | | |
|---|---|---|---|---|
| | 0 | 8 | 16 | 24 |
| 0 | E; J | E; J | E; J | E; J |
| 4 | Ca; J | Ca; J | Ca | Cb |
| 8 | Ca; J | Ca; J | Cb | Cb |
| 12 | | Ca | Cb | Cb |

Table 5
[2S aluminum, 85° C., 20% NaOH.]

| Triethanolamine, percent by weight | Aluminate, percent by weight | | | |
|---|---|---|---|---|
| | 0 | 8 | 16 | 24 |
| 0 | Ca | Aa | H | H |
| 4 | Ca | Ca | Ca | Aa |
| 8 | Ca | Ca | Ca | F; K |
| 12 | | Ca | Aa | K; J |

Table 6
[2S aluminum, 85° C., 24% NaOH.]

| Triethanolamine, percent by weight | Aluminate, percent by weight | | | |
|---|---|---|---|---|
| | 0 | 8 | 16 | 24 |
| 0 | | | | |
| 4 | Ca; J | Aa; J | Ba; J | E |
| 8 | Ca; J | Ca; J | Ca; J | E |
| 12 | Ca; J | Ca; J | Ca; J | E |

Table 7
[24S aluminum, 98° C., 12% NaOH.]

| Triethanolamine, percent by weight | Aluminate, percent by weight | | | |
|---|---|---|---|---|
| | 0 | 8 | 16 | 24 |
| 0 | Ca | Ca | H; Ca | H; Ca |
| 4 | Ca | Ca | Ca | A |
| 8 | Ca | Ca | Ca | A |
| 12 | | Ca | A | E |

Table 8
[24S aluminum, 98° C., 20% NaOH.]

| Triethanolamine, percent by weight | Aluminate, percent by weight | | | |
|---|---|---|---|---|
| | 0 | 8 | 16 | 24 |
| 0 | H; Ca | H; Ca | H; Ca; J | H |
| 4 | A; J | A; J | A; J | Ca |
| 8 | A; J | A; J | A | Ca; J |
| 12 | | A; J | Ca | Ca |

Table 9
[24S aluminum, 98° C., 24% NaOH.]

| Triethanolamine, percent by weight | Aluminate, percent by weight | | | |
|---|---|---|---|---|
| | 0 | 8 | 16 | 24 |
| 0 | | | | |
| 4 | Ca; J | Ca; J | Ca; J | Ca |
| 8 | Ca; J | Ca; J | Ca; J | Ca |
| 12 | Ca; J | Ca; J | Ca; J | Ca; J |

Table 10
[24S aluminum, 85° C., 12% NaOH.]

| Triethanolamine, percent by weight | Aluminate, percent by weight | | | |
|---|---|---|---|---|
| | 0 | 8 | 16 | 24 |
| 0 | Ca | Ca | Ca | Ca |
| 4 | Ca | Ca | A | A |
| 8 | Ca | Ca | A | Ca |
| 12 | | Ca | E | Ca |

Table 11
[24S aluminum, 85° C., 20% NaOH.]

| Triethanolamine, percent by weight | Aluminate, percent by weight | | | |
|---|---|---|---|---|
| | 0 | 8 | 16 | 24 |
| 0 | Ca | Ca | Ca; H | Ca; H |
| 4 | A | A | A | Ca |
| 8 | A | A | A | Ca |
| 12 | | A | Ca | Ca |

Table 12
[24S aluminum, 85° C., 24% NaOH.]

| Triethanolamine, percent by weight | Aluminate, percent by weight | | | |
|---|---|---|---|---|
| | 0 | 8 | 16 | 24 |
| 0 | Ca; J | Ca; J | Ca; J | Ca |
| 4 | Ca; J | Ca; J | Ca; J | Ca |
| 8 | Ca; J | Ca; J | Ca; J | Ca |
| 12 | Ca; J | Ca; J | Ca; J | Ca |

Table 13
[61S aluminum, 98° C., 12% NaOH.]

| Triethanolamine, percent by weight | Aluminate, percent by weight | | | |
|---|---|---|---|---|
| | 0 | 8 | 16 | 24 |
| 0 | H | H | H | |
| 4 | Aa | Aa | Aa | |
| 8 | Aa | Aa | Aa | |
| 12 | | | | |

Table 14
[61S, aluminum, 98° C., 20% NaOH.]

| Triethanolamine, percent by weight | Aluminate, percent by weight | | | |
|---|---|---|---|---|
| | 0 | 8 | 16 | 24 |
| 0 | H | H | H | |
| 4 | Aa | Aa | Aa | |
| 8 | Aa | Aa | Aa | |
| 12 | | | | |

Table 15
[61S aluminum, 85° C., 12% NaOH.]

| Triethanolamine, percent by weight | Aluminate, percent by weight | | | |
|---|---|---|---|---|
| | 0 | 8 | 16 | 24 |
| 0 | Ca | Ca | Ca | |
| 4 | A | A | A | |
| 8 | H | H | Aa | |
| 12 | H | H | Aa | |

Table 16
[61S aluminum, 85° C., 20% NaOH.]

| Triethanolamine, percent by weight | Aluminate, percent by weight | | | |
|---|---|---|---|---|
| | 0 | 8 | 16 | 24 |
| 0 | Ca; H | Ca; H | Ca; H | |
| 4 | H | Aa | Aa | |
| 8 | Aa | Aa | Aa | |
| 12 | | | | |

Table 17
[61S aluminum, 85° C., 24% NaOH.]

| Triethanolamine, percent by weight | Aluminate, percent by weight | | | |
|---|---|---|---|---|
| | 0 | 8 | 16 | 24 |
| 0 | Ca | | | |
| 4 | Ca | | | |
| 8 | Ca | | | |
| 12 | | | | |

Table 18
[75S aluminum, 98° C., 12% NaOH.]

| Triethanolamine, percent by weight | Aluminate, percent by weight | | | |
|---|---|---|---|---|
| | 0 | 8 | 16 | 24 |
| 0 | H | H | H | H |
| 4 | I | A | A | A |
| 8 | I | A | A | A |
| 12 | | A | A | Ca |

Table 19
[75S aluminum, 98° C., 20% NaOH.]

| Triethanolamine, percent by weight | Aluminate, percent by weight | | | |
|---|---|---|---|---|
| | 0 | 8 | 16 | 24 |
| 0 | H | H | H; J | H; J |
| 4 | A | A; J | A; J | Cb; J |
| 8 | A | A; J | A; J | Cb; J |
| 12 | | Ca; J | Ca; J | Ca; J |

Table 20
[75S aluminum, 98° C., 24% NaOH.]

| Triethanolamine, percent by weight | Aluminate, percent by weight | | | |
|---|---|---|---|---|
| | 0 | 8 | 16 | 24 |
| 0 | | | | |
| 4 | A; J | A; J | Ca; J | Ca; J |
| 8 | A; J | G; J | Ca; J | Ca; J |
| 12 | K; J | Ca; J | Ca; J | Ca; J |

Table 21
[75S aluminum, 85° C., 12% NaOH.]

| Triethanolamine, percent by weight | Aluminate, percent by weight | | | |
|---|---|---|---|---|
| | 0 | 8 | 16 | 24 |
| 0 | Ca | Ca | Ca; H | Ca; H |
| 4 | A | A | A | A |
| 8 | A | A | A | A |
| 12 | | A | A | D |

Table 22

[75S aluminum, 85° C., 20% NaOH.]

| Triethanolamine, percent by weight | Aluminate, percent by weight | | | |
|---|---|---|---|---|
| | 0 | 8 | 16 | 24 |
| 0 | H | H | H | H; J |
| 4 | Ba | A | A | A; J |
| 8 | A | A | A | K; J |
| 12 | | A | D; E | K; J |

Table 23

[75S aluminum, 85° C., 24% NaOH.]

| Triethanolamine, percent by weight | Aluminate, percent by weight | | | |
|---|---|---|---|---|
| | 0 | 8 | 16 | 24 |
| 0 | | | | |
| 4 | A; J | A; J | G; J | A; J |
| 8 | A; J | A; J | Ca; J; G | A; J |
| 12 | A; J | G; J | G; J | Ca; J |

It will be observed by reference to Table 1 that the addition of a small amount of triethanolamine to the 12% NaOH solution improves the action of the etchant in some respects, even though no aluminate is added to the initial mixture. Thus, compare the results employing a mixture with no triethanolamine with that containing 4% triethanolamine. It will be seen that the bad pitting has disappeared and by increasing the concentration of triethanolamine to 8% the contouring has disappeared, although the surface is rough. It will be observed that an even greater improvement occurs by adding the aluminate to the triethanolamine mixture with caustic (see the series with 8% aluminate) although with higher aluminate concentrations the triethanolamine concentration should be limited or it may become excessive (see the series with 16 and 24% aluminate).

By increasing the initial concentration of caustic, higher initial concentrations of aluminate can be tolerated as well as higher concentrations of triethanolamine. Compare the series with 20% caustic of Table 2 with that of Table 1. The same phenomenon appears in the 24% caustic concentrations (see Table 3). The addition of the triethanolamine to the 24% NaOH mixtures with aluminate gives "Aa" surfaces. Additionally, this higher concentration of caustic results in specular finishes (see Tables 2 and 3).

Comparing the results of Tables 1, 2 and 3 with those of Tables 4, 5 and 6, show that the results obtainable at the lower temperature are generally not as satisfactory as those at 98° C., but here also the triethanolamine and aluminate acting with the caustic will produce satisfactory etches where the absence of triethanolamine and aluminate will not do so.

In the copper bearing 24S alloy at 98° C. shown in Tables 7 to 9 (employing 12% caustic—see Table 7), it requires relatively high concentrations of aluminate and triethanolamine to obtain satisfactory results (see in Table 7 the 16% and 24% aluminate columns), and in the 24% aluminate column the optimum concentrations of triethanolamine appears to be in the 4 and 8 percent triethanolamine range.

It appears however that the initial concentrations of caustic should not be made too excessive, since the results obtained with the series of Table 8 are better than those of Table 9. But in Table 8 it also appears that the addition of triethanolamine to the solution of caustic in the absence or presence of initially added aluminate improves the results obtained. Here also appears the phenomenon that excessive concentrations of triethanolamine and aluminate give poorer results (see the 16 and 24% aluminate columns of Table 8). The phenomenon of formation of specular surfaces also appears in the series of Tables 8 and 9, compared with those of Table 7.

The results at 98° C. (Tables 7–9) parallel the results of the series of Tables 10–12 with some differences at the high concentrations of aluminate and low concentrations of alkali. Compare the 24% aluminate series of Table 7 with those of Table 10.

The results with the low copper high magnesium 61S alloy (Tables 13–17) illustrates the effectiveness of the triethanolamine both at 98° C. (Tables 13 and 14) and at 85° C. (Tables 15–17). Thus in both the 12% and 20% solutions of caustic at concentrations of initially added aluminate up to 16%, the addition of 4 and 8% triethanolamine gave satisfactory etch where their absence produced contoured surfaces. At 85° C. it required higher concentrations of aluminate to produce this result, where the initial aluminate concentration appeared unimportant in the 98° C. series. Thus compare Table 15 with Table 13. It will also be observed that an increase in the initial concentration of alkali from 12 to 20% made lower initial concentrations of aluminate produce "Aa" surfaces. Thus, compare Table 16 with Table 15.

The high copper, high magnesium, high zinc 75S aluminum alloy (see Tables 18–23) further illustrates my invention. Thus in Table 18 the 12% NaOH solution containing initially added aluminate is improved by the addition of triethanolamine. By increasing the initial concentration of caustic the specular finish is obtained, but the concentrations of triethanolamine and initially added aluminate permissible, is lowered (compare the 8%, 16% and 24% triethanolamine series of Table 18 with that of Table 19).

In fact, the addition of the triethanolamine in the absence of added aluminate in Table 19 (see 0% aluminate series) gave "A" surfaces, where none was obtained in the same series of Table 18. However, in going to 24% NaOH, lower concentrations of added aluminate and triethanolamine are required, as compare the 8 and 16% aluminate series of Table 20 with those of Table 19.

The series at 85° C. (Tables 21 to 23) are similar in result to those at 98° C. (Tables 18–20) but higher concentrations of aluminate and alkali are permissible to get "A" surfaces. (Compare Tables 22 and 23 with 19 and 20.)

The tables shown in Figs. 1 to 6 of the accompanying drawing present a summary of the etchant compositions and conditions required for producing a smooth "A" or "Aa" etch on the 2S, 24S, 61S and 75S alloys, based on the results reported in Tables 1 to 23 above. In Figs. 1 to 6, e. g., Fig. 1, the specific etchant compositions are each represented by a small square. Where an entry "2," "24," "61" or "75" is made in a small square, this number corresponds to the alloy 2S, 24S, 61S or 75S, respectively, for which the composition indicated by such square was found to produce an "A" or "Aa" etch. Where a number within such small squares bears a star at its right, this indicates formation of an "Aa" etch on the corresponding alloy, and where the number is not starred, this indicates formation of an "A" etch on the corresponding alloy.

Figs. 1 to 3 represent operation at 98° C. and Figs. 4 to 6 represent operation at 85° C. Figs. 1 and 4 represent operations carried out with 12% NaOH, Figs. 2 and 5 with 20% NaOH and Figs. 3 and 6 with 24% NaOH. In each of the Figures 1 to 6, percentage of sodium aluminate of 0, 8, 16 and 24% are each represented by the vertical columns, and percentage of triethanolamine of 0, 4, 8 and 12% are each represented by a horizontal row. Hence, each small square in each of Figs. 1 to 6 represents a composition having specific amounts of sodium hydroxide, sodium aluminate and triethanolamine. The sodium aluminate employed in Figs. 1 to 6 is the above noted sodium aluminum trihydrate, It is seen from Figs. 1 to 6 that the etchant compositions having 0% triethanolamine (with only one exception noted in Fig. 5 for 2S aluminum) performed unsatisfactorily on all four alloys. However, even for the single exception on 2S aluminum, employing a composition of 20% NaOH and 8% sodium aluminate (with 0% triethanolamine) the etch was an "Aa" etch, which is inferior to the preferred "A" etch. The compositions represented by the shaded areas were solids melting well above room temperature, but below the operating temperature. Baths formed from these latter compositions exhibited a frothing tendency and hence are not preferred in commercial application although they may in some instances produce a substantially satisfactory etch on certain alloys, as indicated by the shaded squares containing numbers, shown in Figs. 3 and 6. However, by adding small amounts of certain agents to these normally solid compositions, they can be rendered fluid at room temperature, thus permitting an increase in the amount of NaOH and sodium aluminate above the 24% for each noted in Figs. 3 and 6. Illustrative of additives which may be employed for this purpose are the ligno sulfonates disclosed in U. S. Patent 2,741,051, and marketed as "Marasperse" and "Maracell" by Marathon Chemical Company, used, for example, in an amount of about 4% by weight of the solid composition on the dry basis. Those compositions containing triethanolamine and represented in Figs. 1 to 6 by unshaded squares containing an unstarred number are preferred. As seen in Figs. 1, 2, 4 and 5, preferred compositions which give satisfactory etches on various alloys may contain about 12 to 20% NaOH, about 8 to 16% sodium aluminate, and about 4 to 8% triethanolamine.

In addition to the results noted above in Tables 1 to 23 and Figs. 1 to 6, employing specific etching compositions on the various alloys, Table 24 below gives certain etchant compositions which are particularly effective for the specific functions indicated. The compositions were incorporated in aqueous solutions as in the case of the runs made for Tables 1 to 23, and the percentages given represent percent of the respective ingredients by weight of the solution. Temperature of operation in each case is given. The letter "N" indicates sodium hydroxide, the letter "L" represents sodium aluminate trihydrate, as described above, the letter "T" represents triethanolamine, "K" represents potassium hydroxide and "KL" represents potassium aluminate. The amounts shown for potassium hydroxide and potassium aluminate are the amounts of the corresponding sodium compounds stoichiometrically equivalent to such potassium compounds.

In Table 24, the term "vertical cutting" means formation of straight vertical walls with the fillet between the bottom of the etch and the wall having a radius about ⅓ or less than the depth of the etch, the term "surface leveling" means that the bottom of the etch is smooth, and the term "glossy brightness" signifies formation of a bright etch. Each of these functions is given independently of the presence of any other functions or results obtained by use of the specific etchant compositions set forth.

produced steeper, sharper walls on 75S than did the nearly equivalent sodium based composition (3) on 24S.

Referring to Table 24, I can, for example, first etch an alloy such as 24S in a "vertical cutting" etchant such as composition (3) for producing the major portion, for example, about 60%, of the intended depth of cut, substantially the remainder except for a small percentage, for example, about 5% of the cut then performed in a "surface leveling" etchant such as composition (1), and the final cutting is performed by means of a brief dip in a "glossy brightening" composition such as composition (4). It will be apparent that such a procedure may be employed using selected compositions noted above in Tables 1 to 23, such compositions being selected to obtain the desired etching functions. Thus, for example, as indicated in Table 19, a composition giving an "A" etch such as one containing 20% NaOH, 0% aluminate, and 4% triethanolamine can be used to produce almost the entire desired etch depth in a 75S alloy, and a second composition giving a "J" etch such as one containing 20% NaOH, 8% sodium aluminate and 4% triethanolamine can be used as a final etchant to finish the cut to its desired depth while at the same time imparting a brilliant specular appearance to the etched surface.

While I have described particular embodiments of my invention for the purpose of illustration, it should be understood that various modifications and adaptations thereof may be made within the spirit of the invention as set forth in the appended claims.

I claim:

1. A process for producing a chemically etched surface on an aluminum article, which comprises treating said article in an alkaline etching bath containing as essential active ingredients an alkali metal hydroxide and triethanolamine.

2. A process for producing a chemically etched surface on an aluminum article, which comprises treating said article in an alkaline etching bath containing as essential active ingredients an alkali metal hydroxide, triethanolamine and an alkali metal aluminate.

3. A process for producing a chemically etched surface on an aluminum article, which comprises contacting said article with an alkaline etching solution containing as essential active ingredients at least 1% by weight of an alkali metal hydroxide and at least 1% by weight of triethanolamine.

4. A process for producing a smooth, chemically etched surface on an aluminum article, which comprises contacting said article with an alkaline etching solution containing as essential active ingredients about 5 to 30% by weight of an alkali metal hydroxide, about 1 to 15% by weight of triethanolamine and 0 to about 30% by weight of an alkali metal aluminate.

5. A process for producing a smooth, chemically etched surface on an aluminum or an aluminum alloy article, which comprises contacting said article with an alkaline etching solution containing as essential active ingredients about 5 to 24% by weight of sodium hydroxide, about 3.5 to 17.5% by weight of sodium aluminate and about 1 to 12% by weight of triethanolamine.

*Table 24*

| Function | Alloy 2S | Alloy 24S | Alloy 75S |
| --- | --- | --- | --- |
| Vertical cutting | | (3) 6.7% N, 20% L, 2% T—98° C | (5) 6.4% K, 23.5% KL, 2% T—98° C. |
| Surface leveling | (1) 20% N, 20% L, 2% T—98° C | (1) 20% N, 20% L, 2% T—98° C.<br>(4) 20% N, 16% L, 4% T—98° C | (1) 20% N, 20% L, 2% T—98° C. |
| Glossy brightening | (2) 12% N, 0% L, 4% T—85° C | (4) 20% N, 16% L, 4% T—98° C | (6) 24% N, 8% L, 8% T—85° C. |

Table 24 shows that the etchant composition (1) containing 20% NaOH, 20% sodium aluminate and 2% triethanolamine has a superior surface leveling function for all three alloys 2S, 24S and 75S. As to the vertical cutting function, the potassium based composition (5)

6. An alkali etchant composition for aluminum which comprises an aqueous solution containing as essential active ingredients an alkali metal hydroxide, triethanolamine and an alkali metal aluminate.

7. An alkali etchant bath for aluminum which comprises a water solution containing as essential active ingredients at least 1% by weight of an alkali metal hydroxide, at least 1% by weight of triethanolamine and an alkali metal aluminate.

8. An alkali etchant bath for aluminum which comprises a water solution containing as essential active ingredients about 5 to 24% by weight of a member of the group consisting of sodium hydroxide and potassium hydroxide, about 3.5% to 17.5% by weight of a member of the group, consisting of sodium aluminate and potassium aluminate, and about 1 to 12% by weight of triethanolamine.

9. An alkali etchant bath for aluminum which comprises a water solution containing as essential active ingredients sodium hydroxide, sodium aluminate and triethanolamine in the form of a composition containing said active ingredients within the range of percentages corresponding to the limits of percentages comprising the percentages designated by the numbered squares shown in Figs. 1 to 6 of the accompanying drawing.

10. An alkali etchant bath as defined in claim 9, the limits of percentages comprising the percentages designated by the numbered unshaded squares shown in Figs. 1 to 6 of the accompanying drawing.

11. An alkali etchant bath as defined in claim 9, the limits of percentages comprising the percentages designated by the squares containing the numbers 24 and 75 shown in Figs. 1 to 6 of the accompanying drawing.

12. An alkali etchant bath as defined in claim 9, the limits of percentages comprising the percentages designated by the unshaded squares containing the numbers 24 and 75 shown in Figs. 1 to 6 of the accompanying drawing.

13. An alkali etchant bath for aluminum which comprises a water solution containing as essential active ingredients about 20% by weight of a member of the group consisting of sodium hydroxide and potassium hydroxide, about 14% by weight of a member of the group consisting of sodium aluminate and potassium aluminate, and about 2% triethanolamine.

14. An alkali etchant bath for aluminum which comprises a water solution containing as essential active ingredients about 12% to 20% sodium hydroxide, about 8 to 16% sodium aluminate and about 4 to 8% triethanolamine.

15. An alkali etchant bath for aluminum which comprises a water solution containing as essential active ingredients about 20% by weight of sodium hydroxide, about 20% by weight of sodium aluminate and about 2% triethanolamine.

16. A solid composition of matter for etching aluminum, which consists essentially of about 5 to 24 parts by weight of a member of the group consisting of NaOH and KOH, about 3.5 to 17.5 parts by weight of a member of the group consisting of sodium and potassium aluminate, and about 1 to 12 parts by weight triethanolamine.

17. An alkali etchant bath as defined in claim 9, the limits of percentages comprising the percentages designated by the unshaded squares containing the number 24 shown in Figs. 1, 2, 4, and 5 of the accompanying drawing.

18. An alkali etchant bath as defined in claim 9, the limits of percentages comprising the percentages designated by the unshaded squares containing the number 75 shown in Figs. 1 to 6 of the accompanying drawing.

References Cited in the file of this patent

UNITED STATES PATENTS

| | | |
|---|---|---|
| 2,106,368 | Wescott | Jan. 2, 1938 |
| 2,650,875 | Dvorkovitz | Sept. 1, 1953 |
| 2,654,701 | Calderon | Oct. 6, 1953 |